UNITED STATES PATENT OFFICE 2,405,447

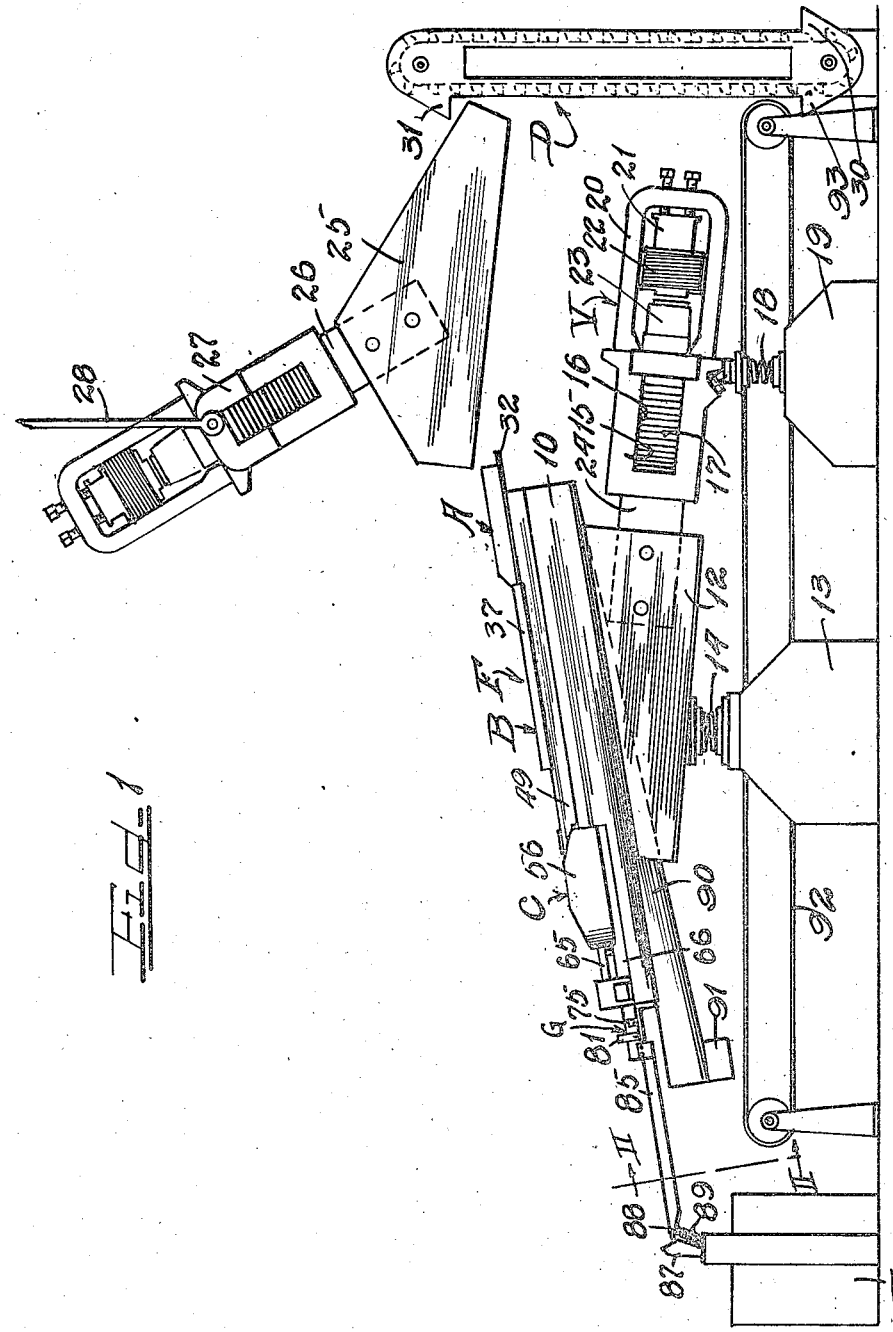

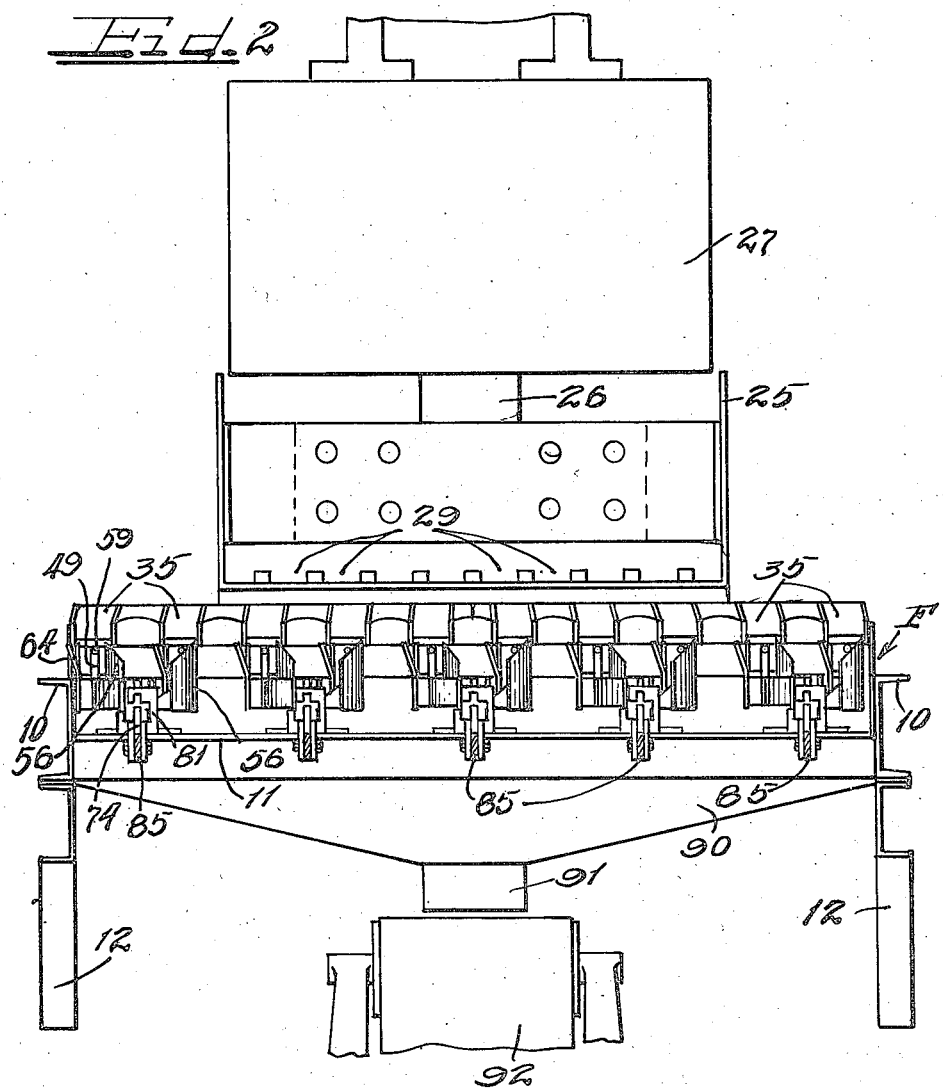

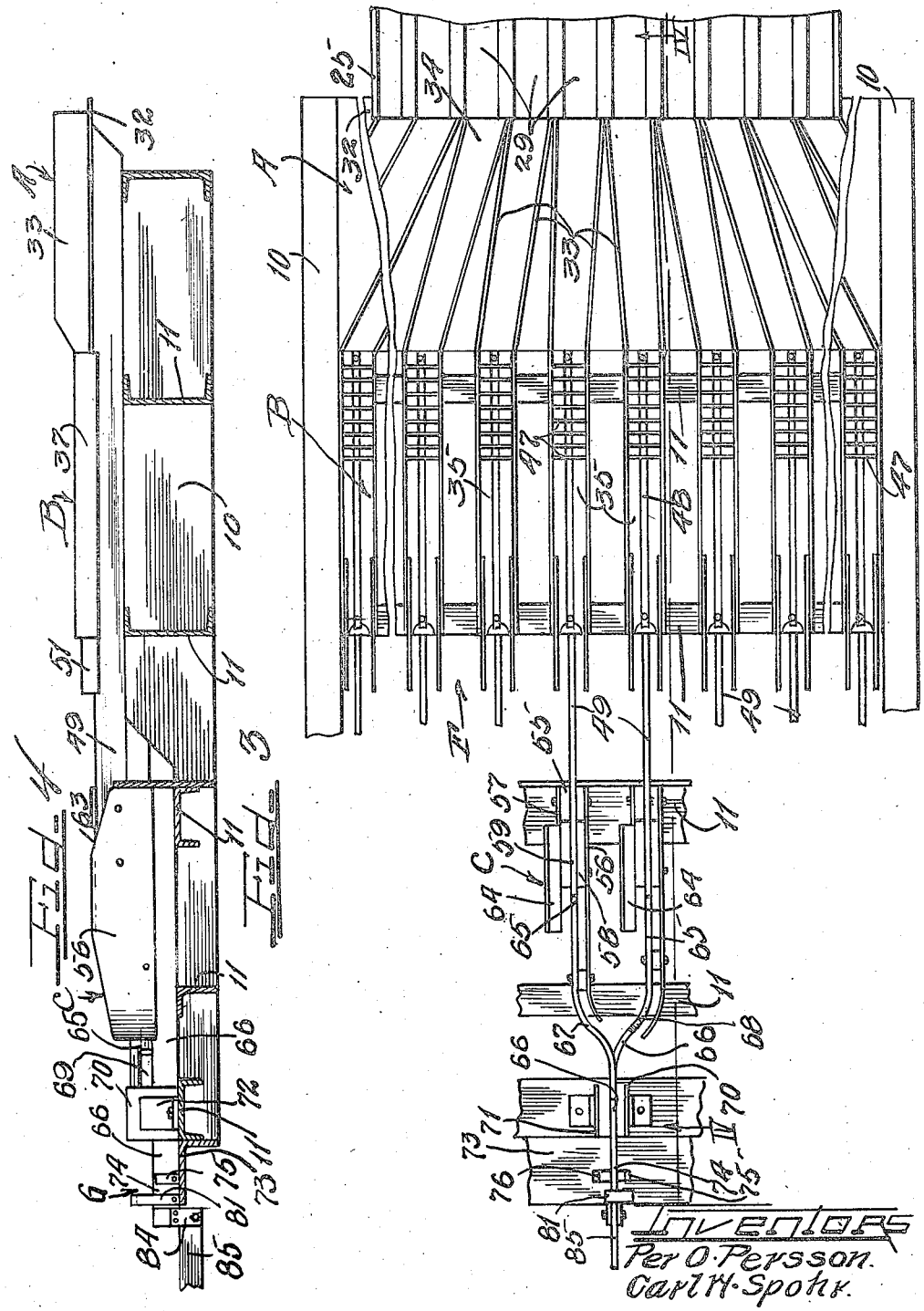

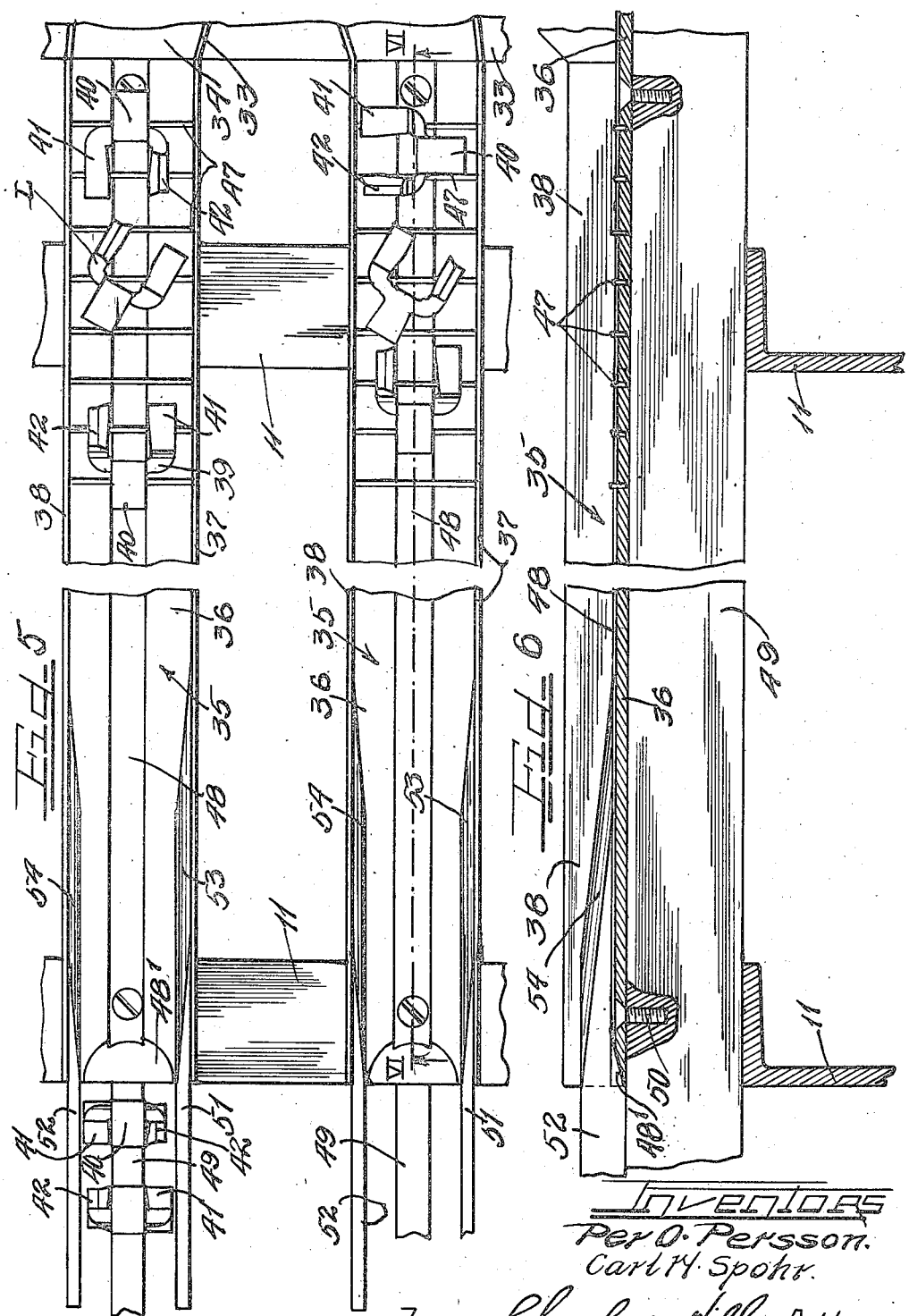

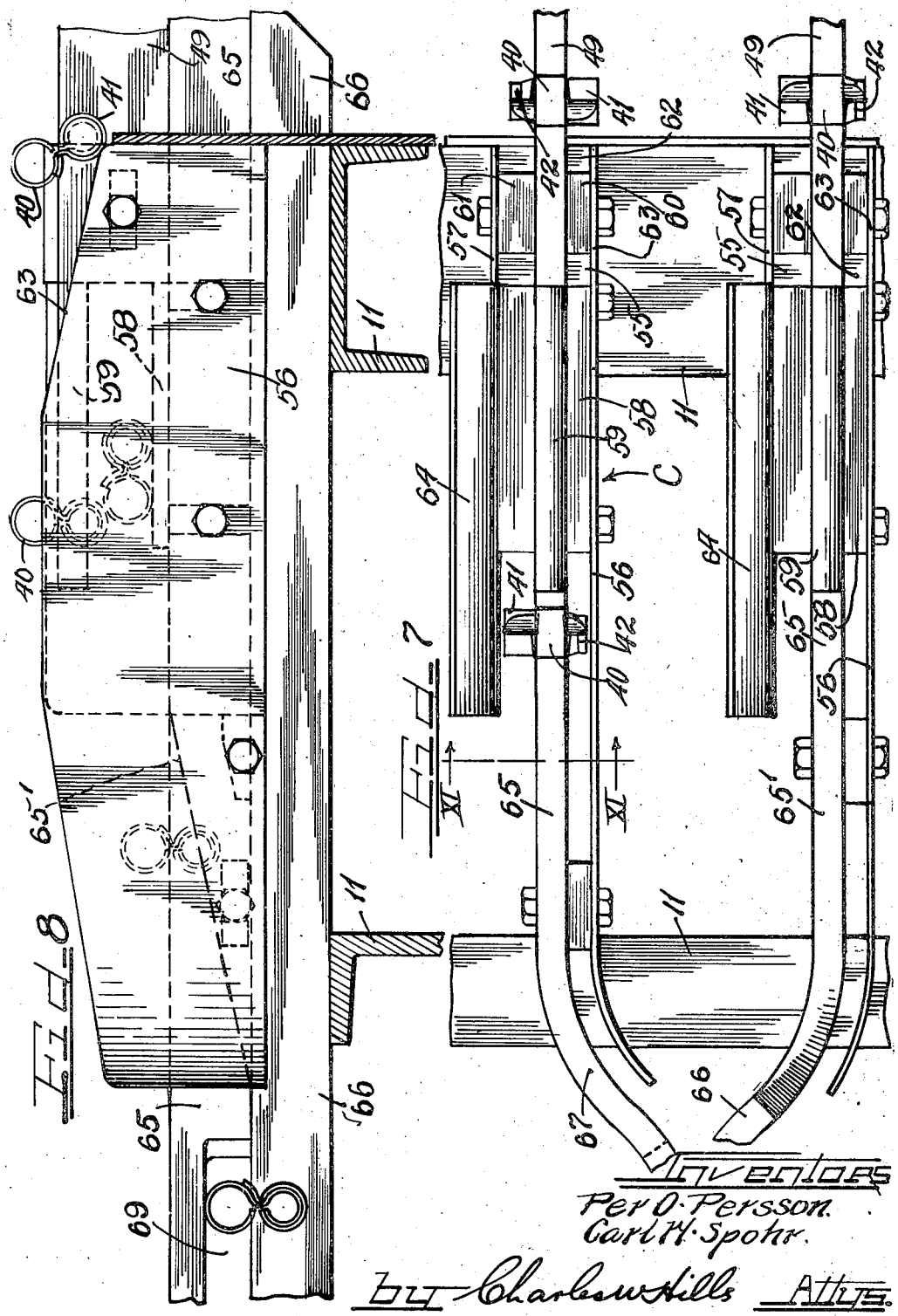

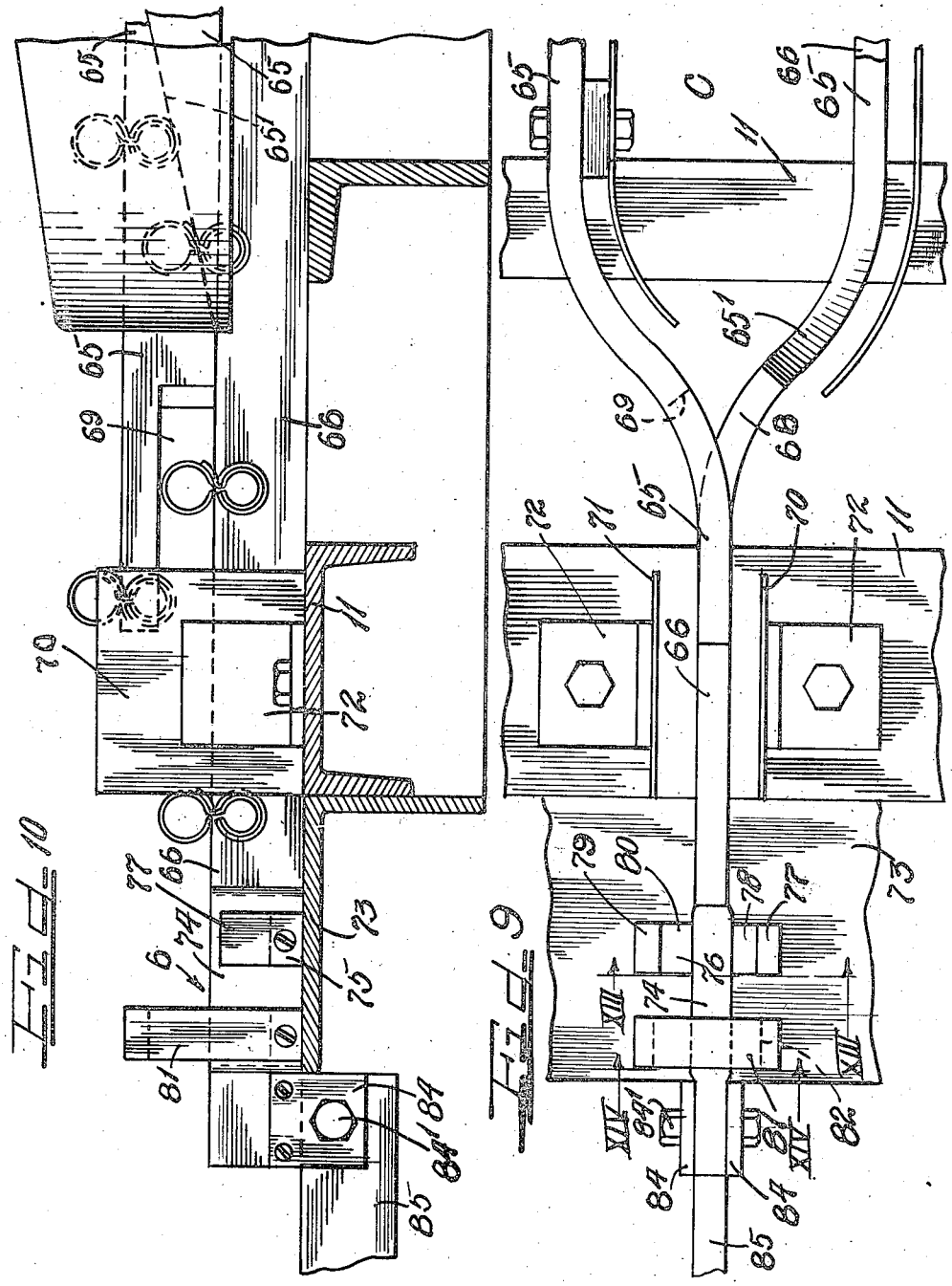

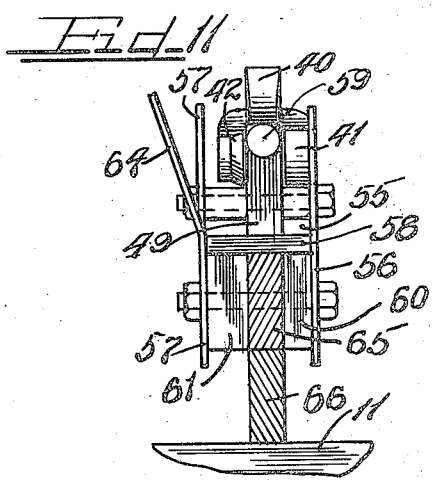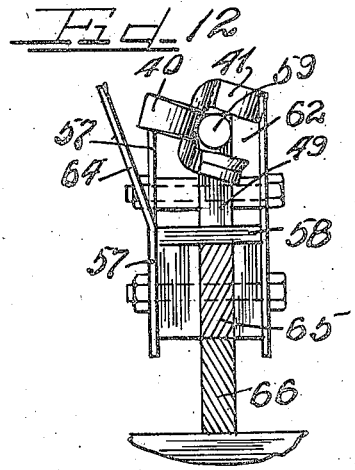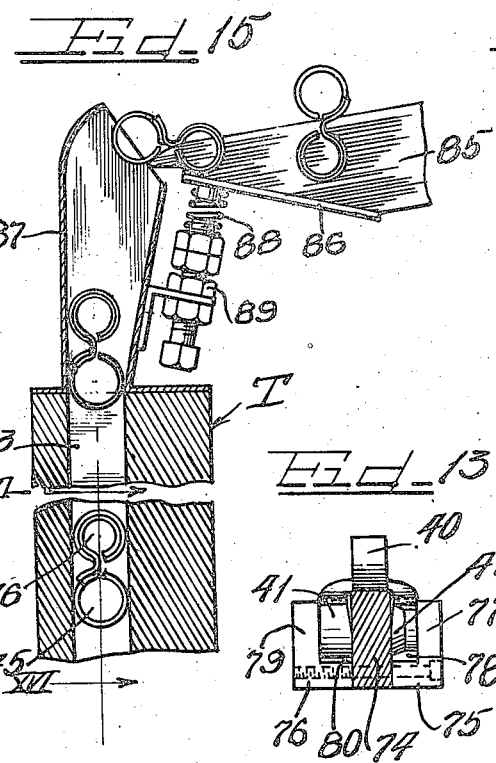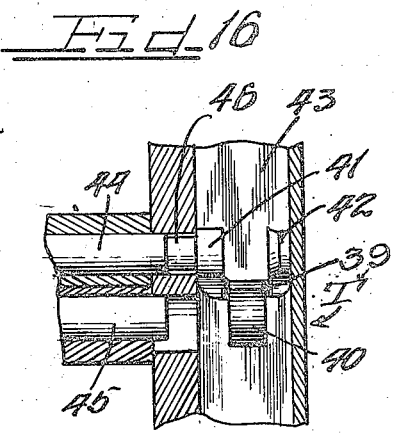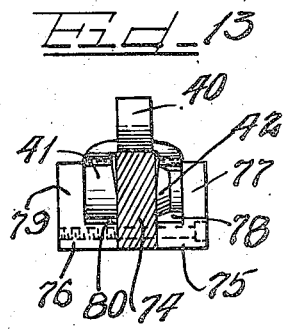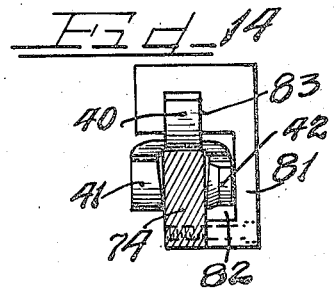

FEED STRUCTURE FOR CARTRIDGE BELT LINKS

Per O. Persson, South Bend, Ind., and Carl W. Spohr, Chicago, Ill., assignors to United States Government, as represented by the Secretary of War and his successors in office Application November 23, 1942, Serial No. 466,600

12 Claims. (Cl. 198—30)

This invention relates to feeding structures which may be used for feeding various types of articles but which is particularly adaptable for feeding metallic cartridge belt links to testing machines, the structure disclosed in this specification having been designed particularly for feeding links, such as disclosed in Laystrom Patent 2,232,071, dated February 18, 1941, to testing machines, such as disclosed in Laystrom et al. Patent 2,286,286, dated June 16, 1942.

Heretofore links have been fed by hand into the testing machines, requiring an operator for each testing machine, thus increasing the cost of testing and also limiting the testing output of the testing machines.

An important object of this invention is to provide a unitary feed structure embodying a plurality of runways along which links are continuously advanced for delivery into a plurality of testing machines.

Another important object is to provide a feeding structure embodying a unitary supporting framework subdivided into a plurality of guideways or runways for the links and subjected to comparatively high frequency vibration for urging the links along the runways for feeding into the testing machines.

Another important object is to provide an arrangement in which each testing machine may be fed from a number of runways.

Still a further object is to provide simple aligning means, and position correcting means effective on the links during passage through the runways for assuring feeding of the links into the testing machines in proper position for receiving testing elements.

Another object is to provide main conveyor mechanism for continuously feeding links from a supply source to the vibrating runway supporting structure, and auxiliary conveyor means for receiving links escaping from the runways and returning them to the main conveyor mechanism.

The above referred to and other important features of the invention are embodied in the structure shown on the drawings, in which:

Figure 1 is a side elevation of the casting assembly;

Figure 2 is an end view on plane II—II Figure 1;

Figure 3 is a plan view of the vibrating runway supporting structure;

Figure 4 is a section on plane IV—IV Figure 3;

Figure 5 is an enlarged plan view of the entrance portion of a pair of runways;

Figure 6 is a section on plane VI—VI Figure 5;

Figure 7 is an enlarged plan view of the outlet end of a pair of runways;

Figure 8 is a side view of the structure on Figure 7;

Figure 9 is a plan view of the ends of a pair of runways and the carrier mechanism for the links from the runways, together with gauge mechanism for gauging the links before passage to the corresponding testing machines;

Figure 10 is a side elevation of the structure on Figure 9;

Figure 11 is a section on plane XI—XI Figure 7 showing a link moving in a wrong position along the runway and the means for correcting the position;

Figure 12 shows the links encountering the correcting mechanism to be turned into correct positions;

Figure 13 is a section on plane XIII—XIII Figure 9 showing one of the gauge elements;

Figure 14 is a section on plane XIV—XIV Figure 9 showing another gauge element;

Figure 15 is a vertical section of the upper inlet end of one of the testing machines showing the manner of guiding links into the testing channel; and Figure 16 is a section on plane XVI—XVI Figure 15 showing the ends of testing arbors for receiving the links.

Referring to Figures 1 to 4, the runway supporting frame F comprises side beams 10 and cross bars or beams 11. Secured to and depending from the side beams 10 are brackets 12 below which are supporting blocks or pedestals 13 connected with the brackets through springs 14. Suitable structure V for vibrating the frame F is provided. The structure shown is of a well-known type comprising a frame body 15 having the passageway 16 therethrough for receiving a bank of leaf springs 17 fulcrumed at their ends on the frame body 15, the frame body being connected at its ends through springs 18 with pedestals 19. A yoke 20 extends from the frame body 15 and supports a stator or field member 21 having an energizing winding 22 thereon. The movable armature structure 23 is secured to the frame 24 which clamps the middle portion of the spring bank 17, and is secured at its outer end to the brackets 12 on the frame F to be vibrated. Upon pulsating or alternating current flow through the winding 22, the attraction of the armature and the recoil of the spring bank 17 will effect vibratory movement of the armature assembly 23, 24 and the frame F. The resilient supports of the frame F and the vibrating device V by the springs 14 and 13 permit the ready vibratory movement of the frame F. The frame F inclines downwardly from the vibrating device, and the vibrating device inclines upwardly toward the frame F so that the vibration of the frame F has a longitudinal component and an upward component, the vibratory movement thus tending to urge particles on the frame F downwardly thereon.

A hopper 25 is provided for feeding articles to the frame F. This hopper is secured to the armature element 26 of a vibrator structure whose stator frame 27 is held by a support 28. This vibrator structure is of the same construction as the vibrator structure V which vibrates the frame F. The arrangement of the hopper and the vibrator is such that the vibration will tend to urge particles along the bottom of the hopper toward the frame F. To spread the articles out along the bottom of the hopper and to guide them to the frame F, the hopper bottom may be provided with channels 29 (Figure 2).

A conveyor D of any suitable type is provided to feed articles into the hopper 25. As shown, the conveyor is of the bucket belt type to the bottom of which at 30 the articles, such as chain belt links, are charged to be carried into the hopper from the conveyor outlet 31.

Referring to Figures 1 to 4, the vibrating structure F has the distributing zone A in which a plate 32 extends between the side beams 10 and has thereon vertical walls 33 defining channels or runways 34 for receiving the articles, such as the belt links, from the channels 29 in the hopper 25.

The next zone B on the frame F comprises a plurality of runways 35 registering at their upper ends with the lower ends of the runways 34 of the zone A. Referring to Figures 5 and 6, these runway structures 35 are supported on cross beams 11 and each runway structure comprises a bottom wall 36 and side walls 37 and 38. In these runways, the articles, such as the links L, are aligned and positioned for further progress along the frame F. Briefly describing the link, it comprises a transverse body part 39 from the middle portion of which a circular loop 40 extends in one direction and from the ends of which circular loops 41 and 42 extend in the opposite direction, the loop 41 receiving the body of a cartridge and the loop 42 being of less diameter and flared as shown to receive the bullet end of the cartridge.

Each link eventually enters one of the testing machines T to undergo a test, such as a test performed in the testing machine of the Laystrom et al. Patent 2,286,286 hereinbefore referred to. Portions of such testing machine are shown on Figures 15 and 16, the testing machine having the test channel 43 into which upper and lower test arbors 44 and 45 are projectable to receive the link loops. The upper arbor 44 has the reduced end 46 for entering the loop 42 of the links, the body of the arbor 44 receiving the loop 41, while the lower arbor 45 receives the loop 40. The links must therefore be fed into the test machine in proper position for receiving the arbors. The manner of entrance of the links from the vibrating structure F into the test machine will be referred to in detail later.

Referring now to Figures 3, 5 and 6, a row of baffles or frets 47 is provided in the bottom wall 36 of each runway structure 35 along the entrance end thereof. The purpose of these frets is to cause the incoming links to assume positions with their loop axes extending transversely of the runways. As the links enter the runways with their loop axes away from such transverse position, the edges of the large link loops will encounter the frets and cause the links to swing around into the proper position. For example, on Figure 5 front runway, the last link shown has its loop axes extending parallel with the runway, but as the edge of the link loop 40 encounters one of the frets, the link will be caused to swing around counterclockwise so that it assumes the position shown in the rear runway of Figure 5. The middle link of the three links shown in each of these runways on Figure 5 is being engaged by the frets and is assuming its proper position in the runway. In the bottom of each runway is a guide channel 48 for receiving the link loops 40 after proper alignment of the loops and for assisting in guiding the links downwardly along the runways 35.

Extending from the lower end of each runway structure 35 is a carrier bar 49 of rectangular cross-section for receiving the links from the runways. As shown on Figure 6, these bars 49 may be mounted on the cross beams 11 and the runways secured thereon as by screws 50. In order to guide the links from the runways to these bars, guide plates 51 and 52 are inserted in the lower ends of the runways with their approach ends 53 and 54 beveled so as to gradually guide the links out of the runways 35 for reception by the respective bars 49. While the links travel through the runways they are lying down flat, but after leaving the runways, their loops 40 will engage the tops of the bars 49 and the loops 41 and 42 will hang down, so that the links straddle the bars. The ends of the runway bottom walls are beveled down as shown at 48′ to assist in guiding the links to the bars. After the links are received by the bars 49, some of the links will have their flared loops 42 at one side of the bar and other links will have these loops at the other side of the bar. Those links which are not properly positioned for entrance into the testing machines must have their positions corrected, and the bars 49 therefore extend to a correcting zone C best shown on Figures 7 and 8. Each bar 49 terminates in a channel 55 in the zone C, each channel having the side walls 56 and 57 and a bottom wall 58. Above the bottom wall 58, the bar 49 has a cylindrical pin 59 extending therefrom to form a continuation thereof. The rectangular end of the bar 49 is aligned in the end of the channel 55 by spacer blocks 60 and 61 so that the space or passage 62 between the bar and the guide wall 56 will be of just sufficient width to receive the flared loops 42 of the links which loops are of less axial width than the loops 41. The link shown on the front bar 49, Figure 7, has its flared loop 42 in alignment with the passage 62 in front of the bar, and this link has the position it should have for entering the testing machine. The link shown on the rear bar, Figure 7, has its wide loop 41 in advance of the passage 62, and the link is therefore in improper position for entering the testing machine. To correct the position of such links the wall 56 and the cylindrical pin 59 cooperate. As best shown on Figure 8, the guide wall 56 extends upwardly beyond the pin 59 and has the inclined or cam edge 63. When a wrongfully positioned link approaches the end of the channel 55, its wider loop 41 encounters the guide wall 56, and as the link proceeds due to the vibration of the frame F, this loop 41 will ride up on the edge or incline 63, as shown on Figures 8 and 12, and the link will be swung, as indicated on Figure 8, and will move along the bar 49 until the pin 59 receives the link, and as the link continues along the pin it will be rotated by the incline 63 around the pin, as shown on Figure 12, and the weight of the loop 40 will then overbalance the link and it will continue to turn until the loop 40 has swung down to the bottom 58 of the channel and the link may drop from the pin 59 onto the bottom 58 of the channel with its flared loop 42 in the proper position in the channel 55. The turning around of the link into proper position is assisted by the guide wing 64 on the side wall 57.

Referring to Figures 7 and 8, a carrier bar 65 extends below the bottom wall 58, and, as the collected links which have fallen onto the bottom 58 are urged forwardly by the vibration, these links will leave the bottom wall to drop onto the bar 65 to straddle the bar and to be suspended therefrom by their loops 40 in proper position for entering the test machine, the links being guided by the engagement of their flared loops between the guide walls 56 and the bars 65.

Links which reach the correcting channels 55 in proper position, as indicated by the link on the front bar 49 in Figure 7, will travel along the bar 49 without engagement with the cam edge or incline 63 and these links will then travel along the cylindrical pin 59 to drop from the end thereof onto the bar 65, and these links then continue along the bar 65 on their way to the testing machine. Thus, during travel of the links through the zone B they will be properly aligned in the runways 35, and during passage through the zone C any links improperly positioned on the carrier bars will be turned so as to assume the proper position on the bars 65 which lead to the testing machine.

The arrangement may be such that each runway path down the vibrator frame F will deposit its links into an individual testing machine, or the arrangement may be such that a number of runways may be combined for delivering their links all to one testing machine. As shown, the runways are arranged in pairs, and the links from each pair are delivered to one of the testing machines. As shown on Figure 3, one pair of the runways delivers links to one of the testing machines T (Figure 1) and other pairs will deliver to other testing machines. Referring to Figures 7 to 10, the bars 65 of each pair deliver their links to a carrier bar 66. As shown, the rear bar (Figures 7 and 9) has the ogee curved end 67 and terminates over the bar 66. The bar 66 has the ogee curve 68 and extends under the front bar 65. The end 65' of this front bar 65 is curved and tapered down to the bar 66. Links on the rear bar 65 will drop off of the end of this bar onto the bar 66, while the links on the front bar 65 will travel down the taper 65' on to the bar 66 and along the bar 66, the end of the rear bar 65 being cut out as indicated at 69 to provide clearance for passage of the links from the front bar 65 to the bar 66, the links from both bars 65 then continuing along this bar 66. The guide walls 56 along the runways have their ends curved to follow the curvature of the bars 65 so as to guide the links around the curves and on to the straight end of the bar 66. Guide walls 70 and 71 are provided adjacent to the end of the rear bar 65 so that links during their fall from the end of the bar on to the bar 66 are guided and held in proper position. The guide walls 70 and 71 are held by brackets 72 mounted on one of the cross beams 11 of the structure F, and this beam also supports the ends of the various bars 66.

Before the links proceed from the bars 66 to the testing machine, or to directly receive cartridges to form a belt, the links should first be gauged for detection of any irregularity in shape. Referring to Figures 9, 10, 13 and 14, the gauge structures G are mounted on a suitable shelf 73 on the structures F, the ends of the bars 66 terminating on this shelf. The gauge means comprises a gauge block or bar 74 whose width with allowable tolerances corresponds to the axial distance between the loops 41 and 42 of a correctly formed link. L plates 75 and 76 are secured with the ends of their lower legs against the sides of the gauge bar 74 at the bottom thereof, the vertical leg 77 of the plate 75 being parallel with and displaced from the adjacent side of the bar 74 by a distance to define a rectangular channel or passageway 78 whose width, with tolerances, is equal to the axial width of the flared loop 42 of the links. The vertical leg 79 of the gauge piece 76 is spaced from the opposite side of the bar 74 to define a rectangular passageway 80 whose width, with tolerances, is equal to the axial width of the loop 41 of the links. The test gauge thus tests each link for any relative axial displacement of the loops 41 and 42.

At its outer end each gauge bar 74 has secured thereto a C-shaped gauge piece 81 which is spaced from one side of the bar to leave the passageway 82 for the loops 42 of the links, and which in its upper wall has a rectangular channel or passageway 83 whose width with tolerances is equal to the axial width of the loops 40 of the links, which passageway is in alinement with the bar 74. The gauge elements are mounted on the shelf 73 with their gauge bars 74 in alinement with the respective bars 66 to form a continuation thereof. As each link leaves a bar 66 it will travel along the bar 74 and its loops 42 and 41 will encounter the gauge pieces 77 and 79, and if the axial distance between the loops 41 and 42 of the links is correct and there has been no distortion, the link can move freely through this gauging field and on toward the gauging piece 81. If the loop 40 of the link is in the proper position axially relative to the loops 41 and 42, and has not been distorted, it will pass through the passageway 83 and the link can then proceed for delivery to the respective testing machine for pull testing. If such testing is not required, the links, instead of delivery to testing machines, could be delivered in proper positions for receiving, in suitable mechanism, the cartridges for forming belts.

At its outlet end, each gauge bar 74 has plates 84 secured to its opposite sides to depend therefrom and to receive between them the end of a bar 85 detachably secured as by a bolt 84', these bars receiving the gauged links for guiding them to the respective testing machines. Any link which fails to move freely through the gauge members is removed by the operator and thrown aside.

The gauged links drop from the ends of the gauge bars 74 onto the bars 85. As shown on Figure 15, the end of each bar 85 has an inclined plate 86 secured thereto for engagement by the loops 41 and 42 to tilt the links for dropping of the end of the bar into the inlet frame 87 on top of the testing machine, the links then progressing, in proper position, through the test passageway 43 for engagement by the test arbors 44 and 45 and testing in a manner described in the Laystrom et al. patent hereinbefore referred to. The end of each bar 85 is preferably resiliently supported by a spring 88 on a bracket 89, secured to the testing machine frame 87, this resilient connection permitting the bars 85 to follow and partake of the vibration of the frame F. The supports for the springs 88 are adjustable, as shown, so that the ends of the bars 85 may be adjusted relative to the frames 87 for accurate feed of the links from the bars 85 into the frames.

During operation of the machine, some of the links may escape from the runways or carrier bars, and sometimes links are removed from the runways or bars to prevent pile-up congestion, but all these links are received by a pan 90 whose bottom slopes toward an outlet 91. Below this outlet is a conveyor belt 92 which receives the links from the pan outlet and carries them back for discharge into the inlet 93 of the conveyor D for return to the hopper 25.

Briefly reviewing the operation of the machine, links are charged into the conveyor D for delivery to the hopper 25 which is vibrated for the distribution of the links in the hopper channels 29 and delivery to the distributor runways 34 in the zone A of the vibrated frame F. The links then travel into the runways 35 of the zone B to be properly alined by the frets 47, the links then being delivered to the various carrier bars 49 for passage through the correcting zone C in which incorrectly suspended links are turned around into proper position, the links then passing through the gauge members and from there to the respective testing machines. By grouping a number of runways all the links passing therethrough will be delivered to a single testing machine, so that testing machines less in number than the number of runways, may take care of the entire output of the feed structure F. Any links falling from or removed from the various runways or carrier bars will be received by the pan 90 for return by the conveyor 92 and conveyor D to the hopper for retravel through the machine. A feeding machine of any capacity may thus be efficiently supervised by a comparatively small number of operators.

We have shown a practical and efficient embodiment of the features of our invention but we do not desire to be limited to the exact construction, arrangement, or operation shown and described as changes and modifications may be made without departing from the scope of the invention.

We claim as our invention:

1. A feed assembly for feeding to a testing machine metallic links of the type described having a transverse body with a single loop extending in one direction from the central part of the body and two loops of different diameter extending from the ends of the body in the opposite direction, comprising a frame defining a runway, means for supplying links to the runway, means for vibrating said frame for travel of the links along the runway, means at the entering end of said runway for aligning the incoming links to lie flat in said runway with their loop axes extending transversely of the runway, a first carrier bar extending from the outlet end of the runway for receiving the links therefrom for suspension from the bar by said single loops and with their other loops depending, a second bar for receiving the links from said first bar, means at the end of said first bar effective to cause links not in proper position to turn said links for reception by said second bar so that all the links received by said second bar will be suspended with their loops of lesser diameter at one side of the bar, and means for guiding the links from said second bar into the testing machine.

2. A feed assembly for feeding to a testing machine metallic links of the type referred to having a transverse body part with a circular loop extending in one direction from the middle portion of the body part and a pair of circular loops of different axial width extending in the opposite direction from the respective ends of the body part, comprising a frame defining a group of runways, means for vibrating said frame for progression of the links through the runways, means for distributing links to said runways, means in said runways for causing the links to travel flatwise along the bottom thereof with the axes of their loops extending transversely of the runways, carrier bars on said frame extending from said runways on which the links are received straddle-wise to be suspended by their single loops with the loop pairs depending, means mounted on said frame defining correcting channels for receiving the links from the ends of said bars, each correcting channel comprising a bottom wall and side walls between which the bars extend, one of said side walls having an upper cam edge and being spaced from the corresponding bar to leave a passageway of sufficient width only to receive the lesser width depending loop of the links whereby the links on the bars with such loops in alignment with said channel passageway may move freely along the bar through said channel, links approaching said channels with their depending greater width loops in alignment with said channel passageway having such loops engaged by said cam edge for canting of the links, each of said bars having a rounded pin extending therefrom above the bottom of the corresponding correcting channel around which the canted links are turned for deposit of the links on the channel bottom with its loops in proper position, and bars leading from said correcting channels for receiving the links from the ends of said first mentioned bars and from said channel bottoms, and a carrier bar mounted on said frame for receiving the links from all of said second mentioned bars and feeding the links to the testing machine, whereby all of the links of the runways of said group will eventually be delivered to the one testing machine.

3. A feed structure for feeding to a testing machine metallic links of the type described each having a single loop at one side and a pair of separated loops at the other side with one loop of the pair of greater axial width than the other, comprising a frame, means for vibrating the frame, a runway on said frame comprising a bottom wall and side walls, means for supplying links to said runway, baffle means in said runway for causing links to travel flatwise along the bottom thereof with its loop axes transversely of the runway, a carrier bar secured to the frame for receiving the links from the runway straddle-wise to be suspended by their single loops with the pairs of loops depending at opposite sides of the bar and with some of the links correctly positioned on the bar for entry into the testing machine but with other links incorrectly positioned with their depending wider loop at the wrong side of the bar, a second carrier bar on said frame leading to the testing machine for receiving correctly positioned links from said first bar, correcting means in the form of a channel at the end of said first bar comprising a bottom wall and side walls, the correctly positioned links being free to travel from said first bar through said correcting channel to said second bar, and a cam edge on one of the side walls of said correcting channel for engagement with the wider loops of incorrectly positioned links and to cooperate with the ends of said first mentioned bar to turn the incorrectly positioned links around in said channel for delivery thereof to the channel bottom in position for correct engagement with said second bar.

4. A feed structure for feeding to a testing machine metallic links of the type described each having a single loop at one side and a pair of axially spaced apart loops on the other side with one of the loops of greater axial width than the other, comprising a frame, means for vibrating said frame, a runway on said frame comprising a bottom wall and side walls, means for supplying links to said runway, baffle means in said runway for causing links to travel flatwise along the bottom thereof with their loop axes transversely of the runway, a carrier bar on said frame for receiving the links straddle-wise from said runway to be suspended by their single loops with their pairs of loops depending and with some of the links correctly suspended on the bar for entry into the testing machine but with other links incorrectly suspended with their wider loops at the wrong side of the bar, a second bar on said frame leading to the testing machine, a correcting channel at the end of said first bar comprising a bottom wall and side walls into which the end of said first bar extends, the end of said first bar terminating in a pin, the correctly positioned links being free to travel through said channel along said pin for reception by said second bar, one of the side walls of said channel having a cam surface engageable by the wider loops of the incorrectly positioned links on said first bar for canting said links around said pin for reception thereof on the bottom of said channel for transfer therefrom in correct position to said second bar.

5. A feed structure for feeding to a testing machine metallic links each having a single loop on one side and a pair of spaced apart loops on the opposite side with one of the pair of loops of greater width than the other, comprising a frame, means for vibrating said frame, a runway on said frame having bottom and side walls, means for supplying links to said runway, baffle means in said runway for causing the links to travel flatwise along the bottom thereof and with the axes of their loops extending transversely of the runways, a carrier bar on said frame for receiving the links from said runway to be suspended from the bar by their single loops with the pair of loops depending along the sides of the bar and with some links in correct position for entry into the testing machine but with other links incorrectly positioned with their wider depending loops at the wrong side of the bar, a second bar leading to the testing machine, the links correctly positioned on said first bar being received by said second bar, and means cooperating with the end of said first bar for correcting the incorrectly positioned links before reception thereof by said second bar.

6. In a feed structure for feeding to a testing machine metallic links each having a single loop on one side and a pair of spaced apart loops on the opposite side with one of the pair of loops of greater width than the other, a runway along which links travel, a carrier bar receiving the links from said runway to be suspended from the bar by their single loops with the pair of loops depending along the sides of the bar and with some links in correct position for entry into the testing machine but with other links incorrectly positioned with their wider loops depending at the wrong side of the bar, a second bar leading to the testing machine, the links correctly positioned on said carrier bar being received directly by said second bar, and means cooperating with the end of said carrier bar for correcting the incorrectly positioned links before reception thereof by said second bar.

7. In a feed structure for feeding to a testing machine metallic links of the type described each having a single loop on one side and a pair of spaced apart loops on the opposite side with one of the pair of loops of greater width than the other, a carrier bar, means for feeding links straddlewise to said carrier bar to be suspended by their single loops with their pairs of loops depending and with some of the links correctly suspended on the bar for entry into the testing machine, but with other links incorrectly suspended with their wider loops at the wrong side of the bar, a second bar leading to the testing machine, and correcting means cooperating with the end of said carrier bar to turn incorrectly positioned links into proper position for reception by said second bar.

8. In a feed structure for feeding to a testing machine metallic links each having a single loop on one side and a pair of spaced apart loops on the opposite side with one of the pair of loops of greater width than the other, a carrier bar for receiving the links straddlewise to be suspended by their single loops with their pairs of loops depending and with some of the links correctly suspended with their wide loops on the right side of the bar but with other links incorrectly suspended with their wide loops at the wrong side of the bar, a second bar receiving the correctly suspended links directly from said carrier bar, and cam means cooperable with said carrier bar to turn incorrectly suspended links into position for reception by said second bar in correctly suspended position, said second bar transferring the links thereon to the testing machine.

9. In a feed structure for feeding to a testing machine metallic links each having a single loop on one side and a pair of spaced apart loops on the opposite side with one of the pair of loops of greater width than the other, a carrier bar, means for feeding links straddlewise to said carrier bar to be suspended by their single loops with their pairs of loops depending and with some of the links correctly positioned on the bar with their wider loops at the right side thereof but with other links incorrectly positioned on the bar with their wider loops at the wrong side thereof, walls defining a correcting chamber into which the end of said carrier bar extends, one of the walls of said chamber being engaged by the wider loops of incorrectly positioned links on said bar to be turned around said bar to fall to the bottom of said chamber with their wider loops at the proper side, and a second bar receiving the links from the end of said carrier bar and from the bottom of said chamber for transmission of all the links in properly suspended position to the testing machine.

10. A feed structure for feeding to a testing machine metallic links each having a single loop on one side and a pair of spaced apart loops on the opposite side with one of the pair of loops of greater width than the other, comprising a frame, a runway on said frame and means for supplying links thereto, a carrier bar structure on said frame for receiving the links straddlewise from said runway to be suspended by their single loops with their pairs of loops depending and with some of the links correctly suspended for entry into the testing machine but with other links incorrectly suspended with their wider loops at the wrong side of the bar structure, cam means adjacent to said bar structure in the path of the wider loops of incorrectly suspended links for cooperating with the bar structure to effect turning of the incorrectly positioned links into position for correct suspension from said bar structure whereby all of the links will be correctly suspended before reaching the testing machine.

11. A feed assembly for feeding to a testing machine metallic links of the type described having a transverse body with a single loop extending in one direction from the central part of the body and a pair of loops of different diameter extending from the ends of the body in the opposite direction, comprising a runway and means for feeding links thereto, a carrier bar structure for carrying the links from said runway to the testing machine, said carrier bar structure receiving the links straddlewise from said runway to be suspended by their single loops with their pairs of loops depending and with some of the links correctly suspended for entry into the testing machine but with other links incorrectly suspended with their larger diameter loops at the wrong side of the bar structure, and means effective during travel of the links along said bar structure for cooperating with the bar structure and the larger diameter loops of incorrectly suspended links for correcting the position of said links whereby all the links will be delivered in properly suspended position to the testing machine.

12. A feed assembly for feeding to a testing machine metallic links of the type described having a transverse body with a single loop extending in one direction from the central part of the body and a pair of loops of different diameter extending from the ends of the body in the opposite direction, comprising a runway for links, a first carrier bar extending from said runway for receiving the links therefrom for suspension by their single loops and with their pairs of loops depending, a second bar for receiving the links from the first bar, means at the end of said first bar effective to cause links not in proper position to turn said links for reception by said second bar so that all of the links received by said second bar will be suspended with their loops of lesser diameter at the same side of the bar, and means for guiding the links from said second bar into the testing machine.

PER O. PERSSON.
CARL W. SPOHR.